(12) United States Patent
McCulley

(10) Patent No.: US 11,694,452 B1
(45) Date of Patent: Jul. 4, 2023

(54) CRANE-MOUNTED SYSTEM FOR AUTOMATED OBJECT DETECTION AND IDENTIFICATION

(71) Applicant: Deshazo LLC, Bessemer, AL (US)

(72) Inventor: Christopher McCulley, Guntersville, AL (US)

(73) Assignee: Deshazo, LLC, Bessemer, AL (US)

( * ) Notice: Subject to any disclaimer, the term of this patent is extended or adjusted under 35 U.S.C. 154(b) by 724 days.

(21) Appl. No.: 16/594,490

(22) Filed: Oct. 7, 2019

(51) Int. Cl.
| | |
|---|---|
| G06V 20/64 | (2022.01) |
| G06T 7/70 | (2017.01) |
| B25J 9/16 | (2006.01) |
| G06F 18/2113 | (2023.01) |
| G06T 7/62 | (2017.01) |
| G06T 7/20 | (2017.01) |
| G01S 17/89 | (2020.01) |
| G01S 7/48 | (2006.01) |
| G05B 19/05 | (2006.01) |

(52) U.S. Cl.
CPC ............ *G06V 20/653* (2022.01); *B25J 9/1697* (2013.01); *G01S 7/4802* (2013.01); *G01S 17/89* (2013.01); *G05B 19/05* (2013.01); *G06F 18/2113* (2023.01); *G06T 7/20* (2013.01); *G06T 7/62* (2017.01); *G06T 7/70* (2017.01); *G05B 2219/1185* (2013.01); *G06T 2207/10028* (2013.01); *G06V 2201/06* (2022.01)

(58) Field of Classification Search
CPC ............ G06T 7/62; G06T 7/70; G06V 20/653
See application file for complete search history.

(56) References Cited

U.S. PATENT DOCUMENTS

| | | | | |
|---|---|---|---|---|
| 4,671,674 | A * | 6/1987 | Detronde | G01N 25/72 382/141 |
| 2006/0165275 | A1* | 7/2006 | Horita et al. | G01B 11/08 382/152 |
| 2015/0291400 | A1* | 10/2015 | Rintanen | B66C 13/46 700/214 |
| 2018/0085923 | A1* | 3/2018 | Nammoto et al. | B25J 9/0087 |
| 2018/0126553 | A1* | 5/2018 | Corkum et al. | G05B 19/423 |
| 2018/0144498 | A1* | 5/2018 | Sugahara et al. | G06T 7/62 |
| 2019/0061159 | A1* | 2/2019 | Domae et al. | B25J 9/1666 |
| 2019/0258225 | A1* | 8/2019 | Link et al. | G05B 19/4097 |
| 2021/0023718 | A1* | 1/2021 | Yoneyama | B25J 9/1697 |
| 2021/0365712 | A1* | 11/2021 | Lu et al. | G06V 20/58 |

* cited by examiner

*Primary Examiner* — Jayanti K Patel
*Assistant Examiner* — Christopher Kingsbury Glover
(74) *Attorney, Agent, or Firm* — Maynard Cooper & Gale, P.C.; Jon E. Holland

(57) ABSTRACT

A LIDAR device is positioned on a crane and is moved along a track to collect 3D image data of the area below the crane. The resulting image data is sent to a computing device that applies or more filtering algorithms to the image data and searches for known image shapes therein through a comparison of the image data and one or more 3D object models based on known shapes or geometric primitives. If an object is identified in the image data and is determined to be accessible, position information for that object may be sent to a device configured to control movement of the crane to grab/pick up the object.

29 Claims, 7 Drawing Sheets

CRANE-MOUNTED SYSTEM FOR AUTOMATED OBJECT DETECTION AND IDENTIFICATION

BACKGROUND

Robotic applications are commonly used to execute a variety of automated tasks, including the manipulation and movement of objects through space, for example in manufacturing, assembly, packing, shipping, and other industries. Automation reduces the need for human action, limiting human intervention in dangerous, difficult, or highly repetitive tasks. Such tasks may include the recognition of objects and their locations and the picking of those objects, processes involving the application of 3-dimensional machine vision. As 3D vision becomes increasingly employed in industrial tasks, additional solutions to improve the scope and efficacy of 3D vision implementations are generally desired.

BRIEF DESCRIPTION OF THE DRAWINGS

The above and other features of the present disclosure, its nature and various advantages will be more apparent upon consideration of the following detailed description, taken in conjunction with the accompanying drawings in which.

Figure 1A:
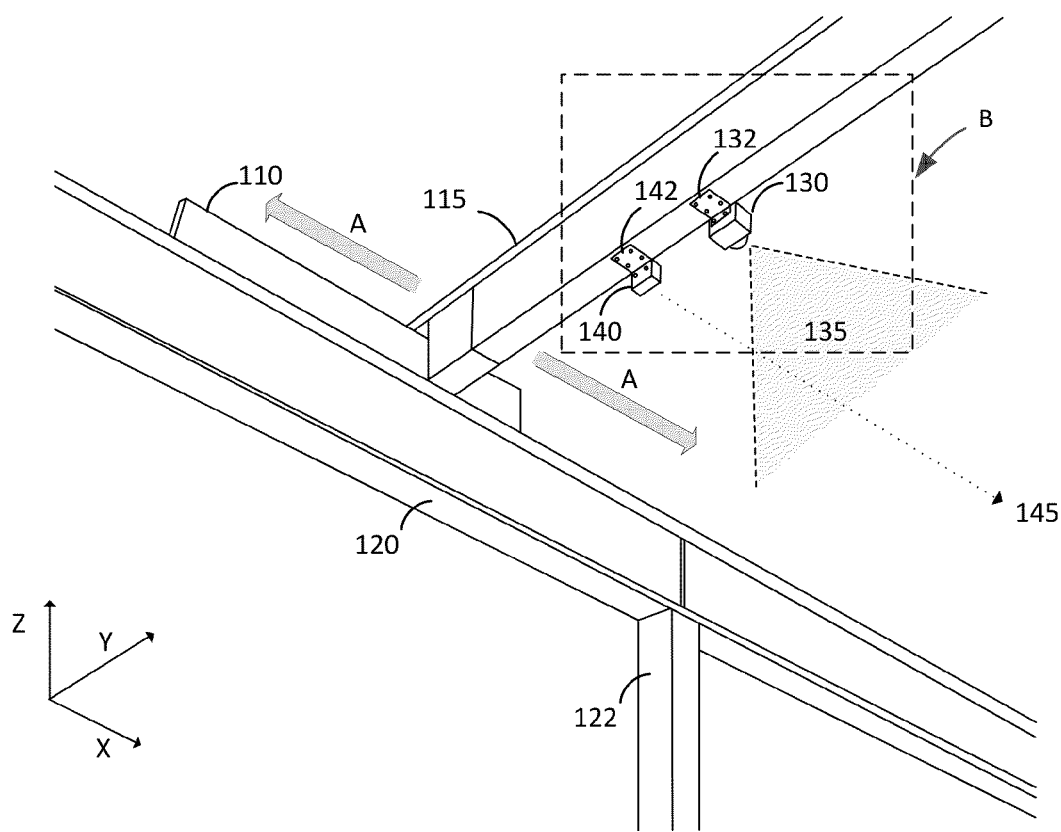
FIG. 1A depicts the placement of an image sensor and a position sensing device on an industrial crane in accordance with some embodiments of the present disclosure.

In the figures, the left-most digit(s) of a reference number identifies the figure in which the reference number first appears. The use of the same reference numbers in different figures indicates similar or identical items or features. Moreover, multiple instances of the same part are designated by a common prefix separated from the instance number by a dash. The drawings are not to scale.

DETAILED DESCRIPTION

A system for automated identification of objects and their respective locations and position may be used for material handling with an automated crane. In one embodiment, one or more 3D image sensing devices may be positioned on an overhead crane, for example those used in industrial applications, so as to map the area below the crane and facilitate the locating of objects in that area. In one embodiment, the image sensing device may be attached so as to be movable through the movement of one or more components of the crane. In this manner, as the image sensing device is moved, image data for different relative areas of a target space may be generated. In one embodiment, the 3D image sensing device is a LIDAR device. In other embodiments, other mechanisms for image sensing can be used, such as a time of flight (ToF) camera, RADAR, or any other type of device capable of creating 3D image data and/or 3D depth map data. An absolute feedback device (e.g., a sensor) may be used to determine a length and/or width position (an x and y position) of the image sensing device at any given point in time.

In an exemplary embodiment, 3D image data is collected by the image sensing device and is sent to a computing module. The computing module may then compare the image data to point clouds generated from a set of predetermined models or primitive images, to determine whether any recognized objects are located within the imaged area. The computing module may recognize these objects regardless of the position they lay in or whether they are adjacent to or touching another object. In some embodiments, the computing module may send position information for the recognized objects to a device configured to control movement of the crane, and the crane may be controlled to grab/pick up the object. In other embodiments, data regarding any recognized objects may be logged or stored in a memory.

In some embodiments, the computing module may perform filtering processes on the image data generated by the imaging sensing device. The number, type, and specifications of the filtering may be dependent on job data predefined with parameters matching one or more objects desired to be searched. In some embodiments, the job data may specify one or more predefined, customized 3D models defining the surfaces of the objects to be searched for, by comparing the 3D models (or keypoints generated therefrom) against the image data. In some embodiments, rather than a predefined 3D model, primitive shape models corresponding to any of various simple 3D geometric shapes (e.g., cube, cylinder, sphere, cone, pyramid, torus) may be applied against the image data.

In one embodiment, the filtering processes may include algorithm(s) that limit, or filter, the image data to consider only certain granularities of physical and logical space. This process may include the generation of different layers of virtual wall(s), corresponding to defined parts of, e.g., a room, a building, a campus, and/or an outdoor area, whether contiguous or non contiguous. In one embodiment, the job data may include definitions of which virtual wall(s) should be applied to the image data, where image data corresponding to areas outside these virtual walls is filtered or cropped out, or ignored or discarded as appropriate.

In some embodiments, the computing module may analyze image data for classification purposes. Shapes recognized in the image data may be classified as one or more known objects. A representative location (x, y, z coordinates) of each object is detected. In real time, the recognized objects may be sorted. For instance, they may be sorted by distance to each object from a known location, the known location corresponding to the position of the crane, the grabber attached to the crane, a centerpoint of the monitored space, or other appropriate locations. In some embodiments, rotation or movement instructions may also be generated to indicate an angle at which a grab attached to the crane should be positioned to pick up an object. The location information and/or rotation instructions may include, in some embodiments, values comprising: x, y, z, rx, ry, rz.

The location information and/or rotation instructions may be provided to a device, such as a programmable logic controller (PLC), that is configured to control movement of the crane by driving different components thereof in order to pick up the identified objects and/or perform one or more automated tasks therewith (such as storing, listing, moving, manipulating, assembling, or the like). In one embodiment, after each object is picked up, the computing module recalculates, in real time, a distance between the known location and the remaining identified objects and provides instructions to the PLC for a new object to pick up.

In one embodiment, prior to sending object location and/or rotation information to the PLC, the computing device may execute algorithm(s) that limit or filter the identified objects to those that can be picked or accessed by a grabbing/gripping component of the crane. For instance, the computing device may in some embodiments compare or superimpose a 3D model of a gripping component (also referred to herein as a gripper) or a portion thereof to an object recognized in the image data to determine whether the object is in a position that allows the gripper to pick up or move the object. For instance, the computing device may consider the placement of walls (whether physical or virtual), floors, ceilings, other objects, and the like, as well as the rotational and movement capabilities of the gripper to make this determination. Further, the computing device may consider the relative positions of the point cloud of the monitored space against the rotational and movement capabilities of the gripper to determine whether the gripper would collide with the any objects, whether identified or unidentified. In such embodiments, the computing device may filter or exclude data regarding objects that cannot be picked or accessed from the data sent to the PLC.

In another embodiment, in addition to (or instead of) sending information to the PLC, the computing module stores the object data in a memory. The memory may be local or on a remote server (viz., in the cloud). The data stored locally or on a cloud-based server may then be analyzed to derive metrics reflecting information about the recognized objects, such as quantity, position/placement, errors in picking the objects if appropriate, or other relevant data. In some embodiments, data from systems, each comprising a 3D camera and a crane and/or grabber positioned at different locations or having different types, may be collected by one or more computing devices and may be aggregated or compiled together.

In contrast to conventional 3D machine vision solutions, the systems and methods described herein position 3D image sensors on a crane or other high-positioned location, thereby providing an effective picking solution for large area applications. Because of the large spatial range of the image data collected, the systems and methods described herein allow for the consideration of a greater volume of image data and the generation of larger data point clouds than conventional applications. Further, in contrast to conventional smaller-area applications that use 3D camera technology, solutions described herein may use LIDAR in a 3D space. In embodiments described herein, in contrast to conventional solutions, LIDAR (or in some embodiments RADAR) is employed on a crane designed to move on a fixed path, to identify determinate objects. These determinate objects may correspond to predefined or primitive 3D models. Accordingly, an effective analysis of known shapes in 3D data from a large spatial area can be performed.

FIG. 1A depicts an illustrative block diagram of a portion of an identification and picking system installed on a crane system. In one embodiment, the crane system includes an industrial crane installed in an indoor (or largely indoor) space (e.g., a building or warehouse) or an outdoor space (e.g., a construction or industrial facility, or any other area). In other embodiments, rather than a crane, the identification and picking system described herein may be installed on any device, so long as the components are located to permit imaging one or more objects in a desired area. For instances, in some embodiments, the identification and picking system may be positioned over a fixed size bin (e.g., 40 in × 40 in) or any other set area.

FIG. 1A illustrates an exemplary placement of an image sensor 130 and feedback device 140, each being attached to or mounted on a beam 115 of a crane via brackets 132 and 142, respectively. Beam 115 is connected in turn to a bar 110 positioned perpendicularly to the beam 115 and in parallel with one or more beams 120 of the crane. Beam 120 is supported by one or more vertical crane beams 122, which may run to the ground/floor of the facility. By these means, image sensor 130 and feedback 140 are positioned high above the ground, or to any appropriate selected height. In an exemplary embodiment, bar 110 is situated in a track attached to and running along the length of beam 120 (or a portion thereof), such that bar 110 is moveable along the track in either Y-axis direction, as shown by the arrows A of FIG. 1A. In some embodiments, the movement of bar 110 on the track is controlled by one or more actuators (not shown). Beam 115, connected directly or indirectly to bar 110, is moved along the Y-axis in tandem with bar 110. Accordingly image sensor 130 and feedback device 140 may be adjusted in their Y-axis position through the controlled movement of bar 110. Image sensor 130 and feedback device are shown positioned below beam 115 in FIG. 1A, however, other embodiments may exist where one or both devices are mounted on top of, on the side/front of, or below the beam 115 or another projecting crane component. The devices may be mounted directly or indirectly, and need not sit flush with the beam 115, so long as they are positioned to move as directed by the crane's movement.

In other embodiments (not specifically shown), the components of the crane may be configured to allow for movement of bar 110 and/or beam 115 (whether independently or collectively) in any X-axis, Y-axis, or Z-axis direction, so that image sensor 130 and feedback device 140 may be positioned at any accessible (x, y, z) coordinate(s). That is, image sensor 130 is moveable in a fixed path with a changeable position in one or more of an x, y, or z direction. Image sensor 130 can therefore generate image data for the entire space below the crane, or a desired subset thereto, from a selected point of reference. In the illustrated embodiment, image sensor 130 and feedback device 140 are fixed in place to beam 115, at an unchanged distance and position with respect to each other. Accordingly, by determining the (x, y, z) position of one component, such as feedback device 140, the (x, y, z) position of the other device can be known or calculated. However, other embodiments may exist where one or both of image sensor 130 and feedback device 140 is moveable with respect to the other's position.

Image sensor 130 may be any type of image sensing device capable of creating 3D image data and/or 3D depth map data. In an exemplary embodiment, image sensor 130 is a LIDAR device. In other embodiments, other mechanisms for image sensing can be used, such as a time of flight (ToF) camera, RADAR, or any other known type of 3D imaging device. Image sensor 130 is capable of imaging the area below the crane at a resolution at which objects in the area can be detected. Therefore, in some embodiments, as the height of the crane increases (assuming that the position of the image sensor 130 increases correspondingly), an image sensor with a sufficiently high resolution may be needed.

Embodiments may be implemented where the components of the crane may not be configured to allow corresponding movement of the image sensor 130 with another crane component, and the image sensor 130 may instead be positioned at a fixed location on the crane. Such an embodiment may be particularly useful where image sensor 130 is capable of generating a wide scope of image data, such as when image sensor 130 is a ToF camera, imaging RADAR, or the like.

Feedback device 140 is, in an exemplary embodiment, an absolute feedback device used to determine a position of the image sensor 130 at a given time of image sensing. In one embodiment, feedback device 140 is a laser (e.g., class 1 eye-safe infrared lasers) or another appropriate light source that emits a light towards a known point (such as a wall or mounted target), and outputs a length and/or width position (an x and y position) of the device 140 with respect to the room or area being imaged. In another embodiment, feedback device 140 may be any device that provides an absolute position, such as an absolute encoder on a wheel, an optical absolute encoder or similar solution that reads a barcode or other marker(s) positioned down the rail on beam 120, a magnetic absolute encoder, a RADAR device, a GPS or other location determining device, and the like.

Figure 1B:
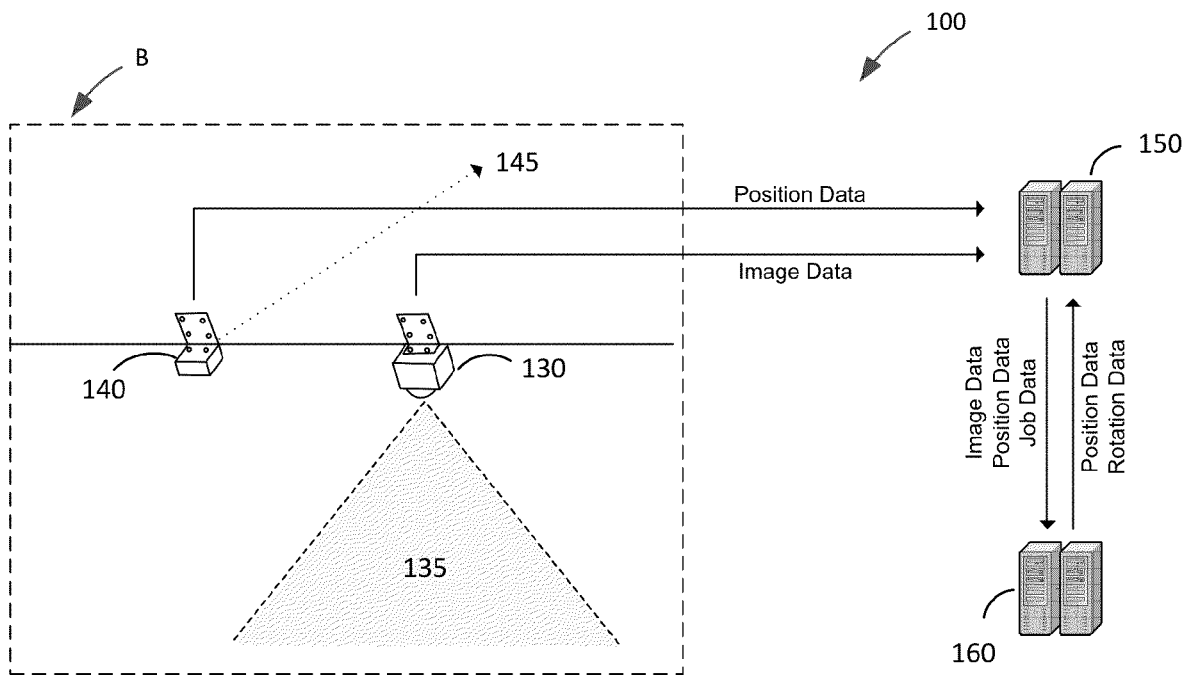
FIG. 1B depicts a block diagram of an object identification and picking system in accordance with some embodiments of the present disclosure.

FIG. 1B illustrates an exemplary environment 100 in which image sensor 130 and feedback device 140 (shown in the configuration of inset B of FIG. 1A) communicate with one or more networked devices, PLC 150, and computing device 160. In particular, FIG. 1B illustrates that feedback device 140 sends its own position information to a control device such as programmable logic controller (PLC) 150, in the form of (y), (x, y), or (x, y, z) coordinates, or any other appropriate value indicating a unique position of the feedback device. In embodiments where the position data does not contain a z (height) value and the beam 115 is moveable in a z-direction, the PLC 150 may perform one or more triangulation or trilateration calculations to determine the height value based on the known x and/or y values.

Image sensor 130 performs a scan of the area 135 below the sensor and sends the resulting image data to one or more computing devices 160 that may include a CPU configured to process that data. The feedback device 140 may send its determined position information to PLC 150 and/or computing device 160 in various embodiments. In alternate embodiments, image sensor 130 may send data to PLC 150, which sends the received image data and position data to computing device 160. In some embodiments, the PLC 150 may also send job data defining a desired "job", or goal to be accomplished in the processing of the image data. Computing device 160 takes in this data, processes it (as described in greater detail herein), and outputs to PLC 150 position data regarding objects identified in the image data and, in some instances gripper rotation data that should be used to access those objects. In other embodiments, computing device 160 may independently access such job data without transmission from the PLC.

Figure 1C:
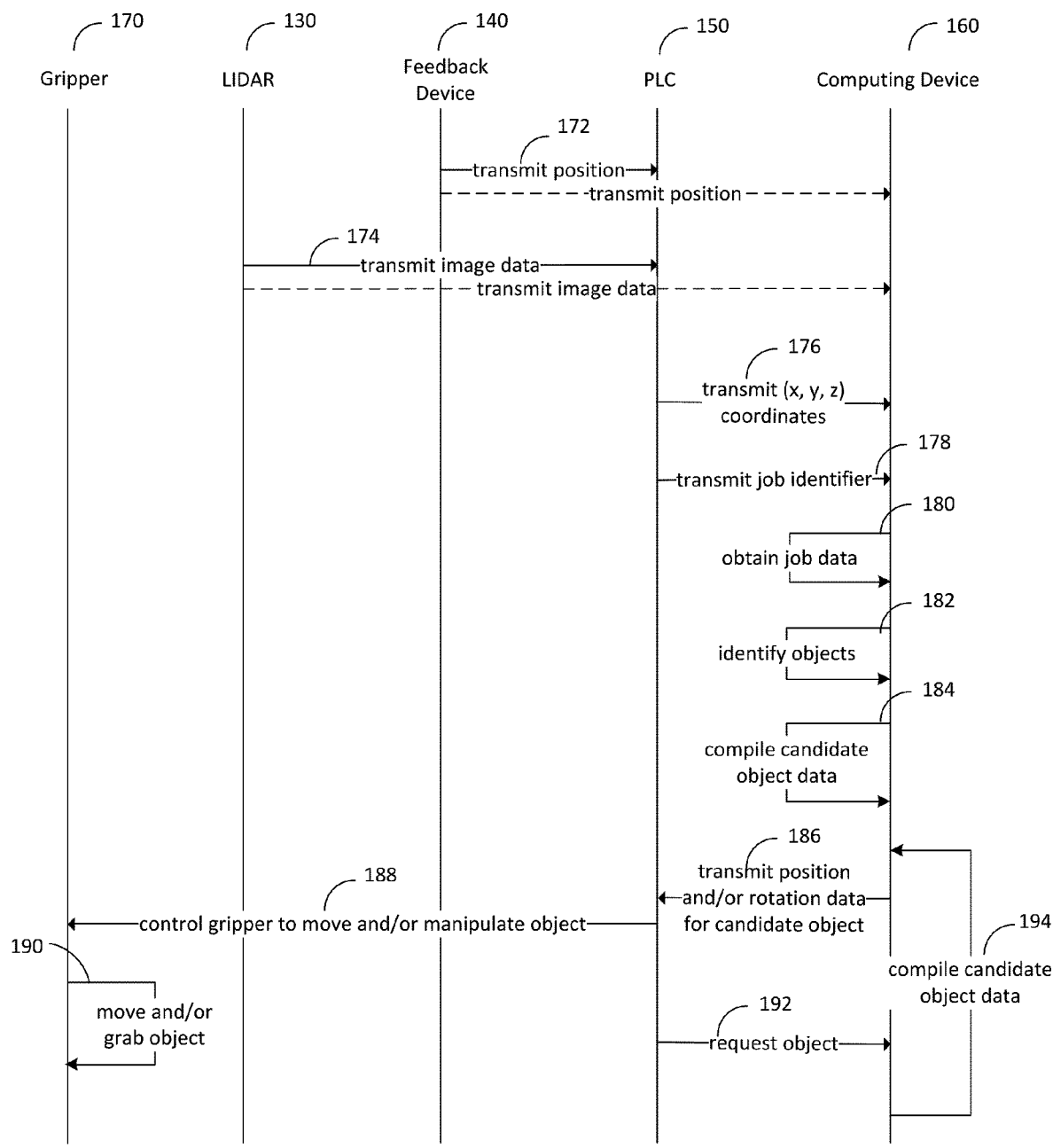
FIG. 1C is a flowchart of an object identification and picking process in accordance with some embodiments of the present disclosure.

FIG. 1C is a flowchart illustrating an exemplary process performed by the components described above with reference to FIGS. 1A and 1B. Initially, in step 172, feedback device 140 sends its own position information to programmable logic controller (PLC) 150, in the form of (y), (x, y), or (x, z) coordinates, or any other appropriate value indicating a unique position. In the embodiment of FIG. 1C, the image sensor 130 is a LIDAR device, however, in other embodiments, the image sensor may be a 3D camera, a RADAR device, or the like. LIDAR 130 performs a scan of the area below and sends the resultant image data to PLC 150 in step 174. As LIDAR 130 is moved above and/or across the area to be imaged (via the corresponding movement of bar 110 along a track), multiple instances of image data may be collected at different positions. Therefore, the process of step 174 may be repeated over several iterations in real time. In other embodiments, where another type of camera 130 is used in place of a LIDAR, a single image may be sufficient to capture the entirety of the area below, and therefore only one iteration of step 174 may be performed. In an embodiment where the image sensor 130 is a 3D camera, the image data sent to the PLC may take the form of (x, y, z) coordinates. In an embodiment where a LIDAR 130 is used, the scan may result in distance and angle data that is later converted to (x, y, z) coordinate data. Such conversion (e.g., a triangulation or other calculation to determine the distances and relative positions of points based on the distance/angle data) may be performed by the image sensor 130 or by the PLC 150, or in some embodiments, by computing device 160.

In an exemplary embodiment, image sensor 130 and/or feedback device 140 send data to PLC 150 (or computing device 160) in realtime. For instance, in embodiments where LIDAR is used as the image sensor 130, image sensor 130 may be able to send image data to only one device at a time. Accordingly, as image data is generated in realtime during movement of the sensor 130 on beam 115 (FIG. 1A), sensor 130 transmits image data directly to the PLC 150, which controls automatic crane motion. This automatic crane motion may include the motion of the components 110 along the track to collect image data and in some embodiments, movement of various other components of the crane (not illustrated) to facilitate general or situational functioning of the crane. PLC 150 may in turn transmit the generated image data to the computing device 160. By these means, even if some amount of lag or latency is experienced in transmission of the data to or processing of the data by the computing device 160, PLC 150 has access to realtime image data and may control the automatic crane motion to operate without interruption. Further, the processing of the PLC 150, in contrast to that of computing device 160, may be deterministic in nature, such as to require performance on a reliable fixed schedule (e.g., at a set interval of x ms), thereby allowing regular and reliable crane movement. However, other embodiments may exist where data is stored in a memory on the devices 130, 140 and later sent to PLC 150 in a bulk transmission, for example, after the scan by sensor 130 is complete or at a predetermined time or interval. Further, embodiments may exist where image sensor 130 is a device capable of broadcasting image data, such as a ToF camera, in which embodiments the device 130 may be configured to broadcast image data for receipt by both PLC 150 and computing device 160 at approximately the same time (absent any latency of transmission). In still other embodiments, computing device 160 may receive data directly from one or both of image sensor 130 and feedback device 140, such direct communication of data in steps 172 and 174 being shown in FIG. 1C as dotted lines.

In step 176, PLC 150 sends the received image and/or position data to one or more computing devices 160 that may include a CPU configured to process that data. The image data is, in an exemplary embodiment, sent as (x, y, z) coordinate data, however, in other embodiments, the data is sent in a different form and is later converted to coordinate data by the computing device 160. In the exemplary embodiment, the PLC 150 may also, in step 178, transmit information sufficient to identify a defined "job," or goal to be accomplished in the processing of the image data. In one embodiment, this may be a job identifier (e.g., job ID) that can be used by the computing device 160 to look up associated job data. As just one example, a defined job may be to search for a particular type of object(s), such as a 50 gallon drum, or any cylindrical object. A job may also define, in some embodiments, a region of the image data in which to search, one or more filters to be applied, and/or other processing criteria or parameters. In some embodiments, such as those where environment 100 includes more than type of image sensor 130, or where the crane may include more than one type of gripper (differing, e.g., in size, shape, precision, sensitivity, etc.), the job information may include data specifying a camera or component crane parts (such as a gripper 170) that are being used to manipulate objects. Of course, the foregoing is merely exemplary, and in other embodiments, the job data sent by the PLC 150 to the computing device 160 may include or otherwise specify any appropriate parameters that define the goal of the image processing.

Computing device 160 takes in the image data and processes it to obtain position data of any objects identified therein. More particularly, in step 180, the computing device 160 uses the received job ID to look up job data that informs computing device 160 as to the type of object(s) to be searched for in the image data and other search parameters. For instance, in some embodiments, the job data may identify one or more 3D models that should be compared against the received image data in a pattern matching process (step 182). In some embodiments, the job data may define additional limitations or conditions on the object identification. In step 184, computing device 160 uses the list of identified objects from step 182 to compile a list of candidate objects, filtering out objects that are inaccessible and/or impractical for manipulation by the crane components (such as gripper 170). Computing device 160 may also sort and/or prioritize object data for output to PLC 150, for example, sorting by distance or object type or to optimize/limit necessary movement of any crane components. In step 186, computing device 160 outputs, for at least one candidate object, position data and, in some instances rotation data to be used in the manipulation of the crane to access the candidate object. In step 188, PLC 150 may take that position data and/or rotation data to drive one or more components of the crane (e.g., crane gripper 170) to pick up or otherwise manipulate objects at the identified position. In some embodiments, gripper 170 may be any type of component capable of grabbing, gripping, picking, placing, moving, pushing, pulling, lifting, rotating, or otherwise manipulating an object within the imaged area. For example, the gripper may be a device on a moveable portion of the crane (e.g., a jib of the crane) that includes a grab, tongs, magnets, or other means of picking up a desired item when the gripper is positioned at the object's location. As one example, gripper 170 may include all or part of a robotic arm and/or manipulator/effector on the arm configured to pick items.

In some embodiments, several objects may be identified within the image data. Accordingly, in the exemplary embodiment, PLC 150 may confirm to computing device 160 in step 192 that a candidate object has been appropriately manipulated (or in some embodiments, if unsuccessfully manipulated, may inform computing device of any relevant information) and may request transmission of another candidate object. Computing device 160 may then remove the previous candidate object from its list of compiled candidate object data (or in some embodiments, edit the data), may recompile or resort (if necessary) the candidate object list in step 194, and may determine position and/or rotation data for a second candidate object to send to PLC 150.

Communication between any of image sensor 130, feedback device 140, PLC 150, computing device 160, and/or crane gripper 170 is performed over a communication network, with one exemplary communication configuration illustrated in FIG. 1B as solid lines. An exemplary communication network may be a wired network, such as Ethernet, Ethernet/IP or other industrial wired protocols, or fiber optics. In other embodiments, the communication network may be a wide area network (such as the Internet), a local area network (such as an intranet), a cellular network or another type of wireless network, such as Wi-Fi, Bluetooth, Bluetooth Low Energy, and/or other close-range wireless communications. In still other embodiments, one or more of any of the above-listed network types may be used, or any combination thereof. In some embodiments, the network may be the Internet and information may be communicated between system components in an encrypted format such by a transport layer security (TLS) or secure socket layer (SSL) protocol. In addition, when the network is the Internet, the components of the environment 100 may use the transmission control protocol/Internet protocol (TCP/IP) for communication.

In the embodiments of FIGS. 1A-1C, image sensor 130 and feedback device 140 are discrete devices that do not communicate with each other, but rather, separately send information to one or more other networked systems (such as programmable logic controller (PLC) 150). In another embodiment, image sensor 130 and feedback device 140 may communicate with each other via a wired or wireless connection. In still other embodiments, the functionalities of both image sensor 130 and feedback device 140 may be performed by different logical components of a single, integral device that communicates with other networked devices. Similarly, PLC 150 and computing device 160 are illustrated in FIG. 1B as discrete network devices connected via a wireless or wired connection, however, in alternate embodiments, the functionalities of both PLC 150 and computing device 160 may be performed by a single, integral device. In still other embodiments, image sensor 130 and feedback device 140 may output data to the integral computing device, or in some embodiments, may broadcast data to one or more devices. Other embodiments may provide for the functionalities of the components of environment 100 to be distributed in whole or in part, that is, functionalities of computing device 160 may be performed by one or more remote servers (or components thereof) or computing resources, that is, in the cloud, whether dedicated or shared.

Figure 2:
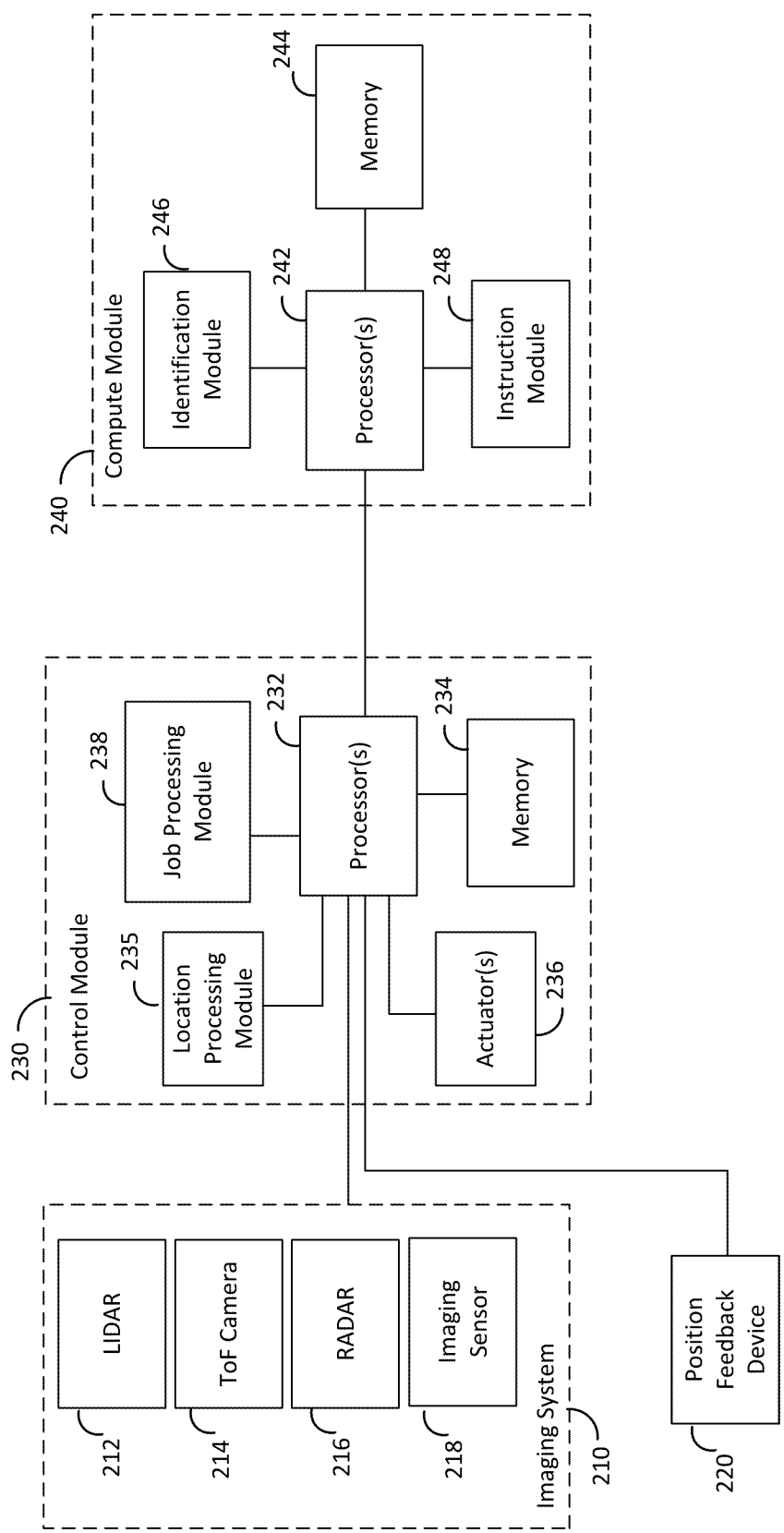
FIG. 2 depicts a block diagram of selected component parts of an object identification and picking system in accordance with some embodiments of the present disclosure.

FIG. 2 illustrates an example schematic diagram of selected components of environment 100. However, while a certain configuration of those components is illustrated, any practical configuration may be used, and the components need not fall into the particular logical groupings illustrated in FIG. 2. Further, it will be generally understood that the architectures described below and illustrated in FIGS. 1A through 6 are not limited to the components discussed herein, and may include other hardware and software components. Rather, for ease of illustration, only the components and functionalities most relevant to the subject systems and methods are discussed herein.

FIG. 2 depicts an imaging system 210 made up of one or more image sensor(s) 130, including one or more of LIDAR 212, time-of-flight (ToF) camera 214, RADAR 216, or other image sensor(s) 218, provided that such sensors can capture a 3D image. FIG. 2 also depicts a position feedback device 220 made up of one or more feedback devices 140. While FIG. 1 depicts four sensors in image system 210 and one position feedback device, an exemplary embodiment may include any number of sensors in imaging system 210 and any number of feedback devices, such that the components of systems 210 and 220 may be in a 1-to-1, 1-to-many, or many-to-1 correspondence (or any appropriate configuration). A relevant consideration is whether absolute position information for each respective sensor 212-218 can be determined.

FIG. 2 further illustrates a control module 230. In an exemplary embodiment, control module 230 is implemented in PLC 150, however, other embodiments may exist where the functions of PLC 150 are instead (or in part) implemented by computing device 160. Compute module 240 is, in an exemplary embodiment, implemented in computing device 160. As illustrated, the components of control module 230 and compute module 240 may be interconnected and may communicate to and/or drive other modules via one or more local interfaces (not shown) which may include at least one bus.

Control module 230 and compute module 240 include one or more processors 232 and 242, respectively, which may execute instructions stored in a corresponding memory 234, 244 to control the module's functionalities. Processor(s) 232, 242 may be respectively implemented by any type of suitable processor and may include hardware, software, memory, and circuitry (or any combination thereof), for example, one or more of central processing units (CPU), digital signal processors (DSP), graphics processing units (GPU), application-specific integrated circuits (ASICs), field-programmable gate arrays (FPGAs), and/or microprocessors programmed with software or firmware, or other types of circuits for performing the described functionalities (described further herein), or any combination thereof. As used herein, memory may refer to any suitable storage medium such as disks, thumb drives, etc., both volatile and non-volatile. Examples of such media include RAM, ROM, EEPROM, SRAM, flash memory, or any other tangible or non-transitory medium that stores information that is accessible by a processor. Different embodiments may have different capabilities, so long as the amount of RAM is sufficient to support reading sensor data, running analysis algorithms, and running all supporting software, as described herein.

Control module 230, in the exemplary embodiment, handles the initial receipt of image data from imaging system 210 and the transmission of such image data to compute module 240. In some embodiments, location processing module 235 of control module 230 may perform a determination of a location of the imaging system(s) 210 based on information received from position feedback device 220. Job processing module 238 may obtain information (from memory 234 and/or from a remotely stored memory), sufficient to describe or identify an object identification job for which computing device 160 can obtain additional relevant information as described in greater detail with reference to FIGS. 4 and 5. Actuator(s) 236 may be coupled to one or more crane control mechanism(s) (not shown), including for example, one or more grippers 170 used to lift objects positioned below the crane within the imaged area. Although a single actuator 236 is depicted in FIG. 2 for simplicity of illustration, any practical number of actuators, corresponding to any number of grippers (rotating and pinching movements), lateral, vertical, or diagonal rotation elements, or other crane components may use variously used. In one embodiment, memory 234 may include a combination of temporary storage (for location/image data) and permanent storage (for job data and the like), though other configurations are possible in other embodiments.

Compute module 240, in the exemplary embodiment, handles the processing of image data to identify and recognize objects therein. An identification module 246 is configured to apply one or more filtering algorithms to the image data and to identify deterministic objects therein based on point cloud data. Instruction module 248 is configured to determine whether and how the crane can be controlled to pick up the identified objects. This determination may include consideration of the position of the object (e.g., whether it is close to a wall) and/or the position and capabilities of the relevant gripper components of the crane. The instruction module 248 outputs instruction data regarding how to pick up or move the recognized objects. The position and/or instruction data is sent to control module 230 and ultimately, to actuator(s) 236, which controls one or more crane components to pick the identified objects.

In other embodiments, the functionalities of both control module 230 and compute module 240 may be executed by processor(s) located in only one of the modules, or located remotely. For instance, in an alternate embodiment depicted in FIG. 6, the functions of the control module and the compute module are consolidated into a single computing device 610, in which one or more processor(s) 620 and memory 622 are communicatively coupled. Processor(s) 622 receives information from the imaging system 210 and position feedback device(s) 220, either by direct transmission or broadcast communication. Modules 235, 238, 246, and/or 248 variously process such image data, in the manner described herein with reference to FIGS. 3-5. In some embodiments, the processed data is stored in memory 622 (or in a remote system) or used to control actuator(s) 236 to pick and/or move targeted identified objects.

Figure 3:
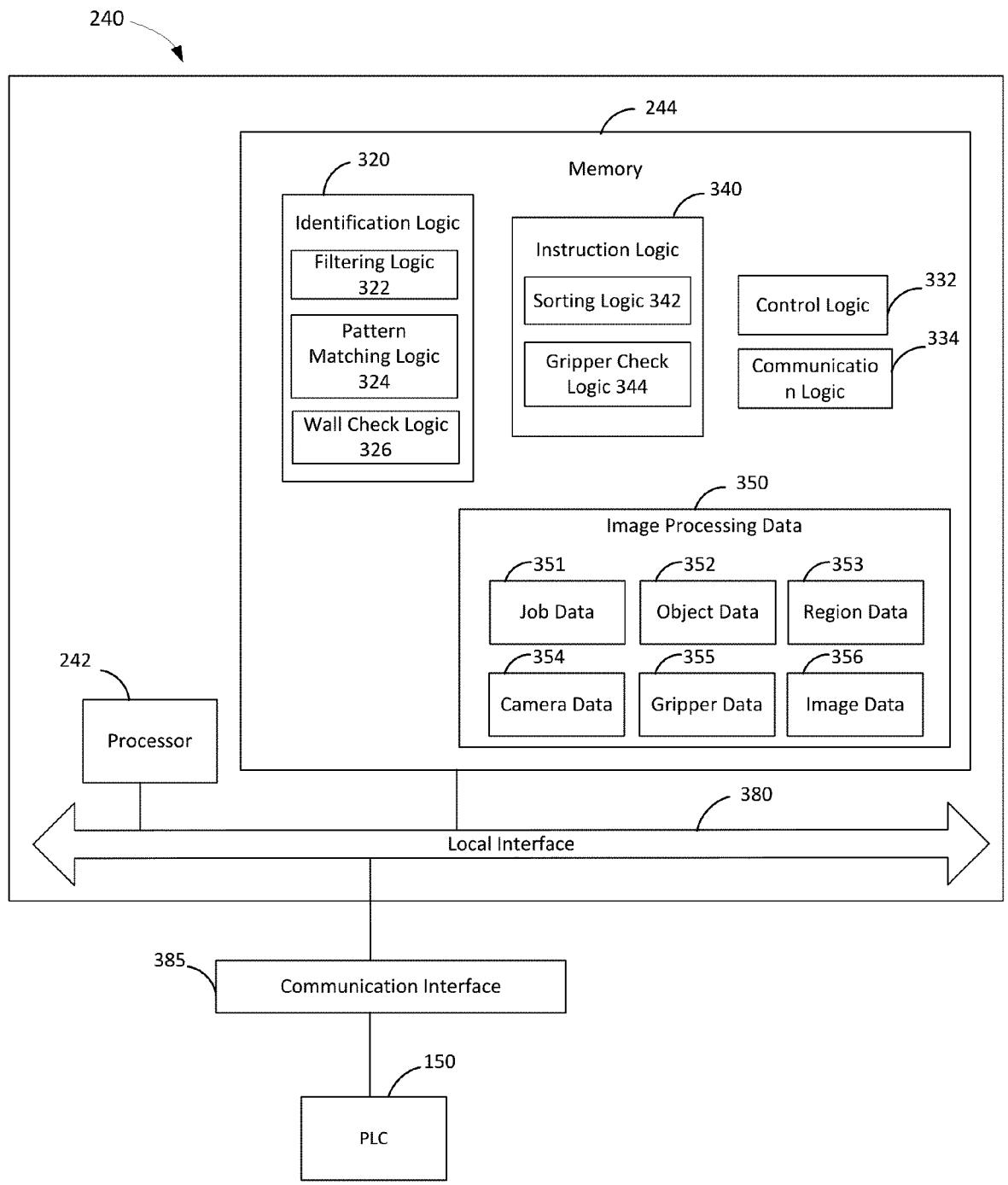
FIG. 3 depicts a block diagram of selected component parts of a computing device of an object identification and picking system in accordance with some embodiments of the present disclosure.

FIG. 3 depicts an example schematic diagram of certain components of computing module 240 in accordance with some embodiments of the present disclosure. Memory 244 and processor(s) 242 are as described above with reference to FIG. 2, communicatively coupled by one or more local interfaces 380 which may take the form of a communication bus. The illustrated embodiment of FIG. 3 depicts a number of components stored in memory 210, specifically, identification logic 320 (including filtering logic 322, pattern matching logic 324, and wall check logic 326), instruction logic 340 (including sorting logic 342 and gripper check logic 344), control logic 332, and communication logic 334. These depicted logics may variously represent one or more algorithms, computational models, decision making rules or instructions, or the like implemented as software code or computer-executable instructions (i.e., routines, programs, objects, components, data structures, etc.) that, when executed by one or more processors 242, program the processor(s) to perform the particular functions of their respective logic. These logics are depicted in FIG. 3 as several discrete components, each labelled as an individual "logic", however, in various embodiments, the functions of each respective logic may be executable on their own or as part of one or more other modules; that is, any configuration of the depicted logical components may be used, whether implemented by hardware, software, firmware, or any combination thereof. The capabilities of these various logics are described in greater detail below.

Identification logic 320, filtering logic 322, pattern matching logic 324, wall check logic 326, instruction logic 340, sorting logic 342, gripper check logic 344, control logic 332, and communication logic 334 may be variously implemented in software, hardware, firmware or any combination thereof. In the exemplary configuration shown in FIG. 3, these various logics are variously implemented in software and are stored in memory 240 of the computing device 160. Note that these components, when implemented in software, can be stored and transported on any non-transitory computer-readable medium for use by or in connection with an apparatus (e.g., a microprocessor) that can execute instructions. In the context of this disclosure, a "computer-readable medium" can be any device or system that can contain or store a computer program for use by or in connection with an instruction execution apparatus.

Control logic 332 may include one or more algorithms or models for generally controlling the operation of computing module 240. The memory 244 may also, in some embodiments, include communication logic 334, including one or more algorithms or models for obtaining information from or communicating information via one or more communication networks. The computing module 240 may, via communication interface 385, operate to exchange data with various components and/or devices on any communication network. For instance, communication interface 385 and communication logic 334 may be used (by, e.g., identification logic 320 and instruction logic 340 in the manner(s) described in greater detail below), to access data from and transmit data to PLC 150 or any other device controlling one or more actuators 236.

The memory 244 may also variously include information stored as image processing data 350, specifically, one or more of job data 351, object data 352, region data 353, camera data 354, gripper data 355, and/or image data 356. In other embodiments, any of all of these components may not be stored on memory 244 of computing device 160 itself, but may instead be stored in a different memory and database, whether local to computing device 160 or on one or more remote servers (in some embodiments, in the cloud). The data in image processing data 350 may be referenced in a manner discussed in greater detail below with reference to FIGS. 4 and 5.

Figure 4:
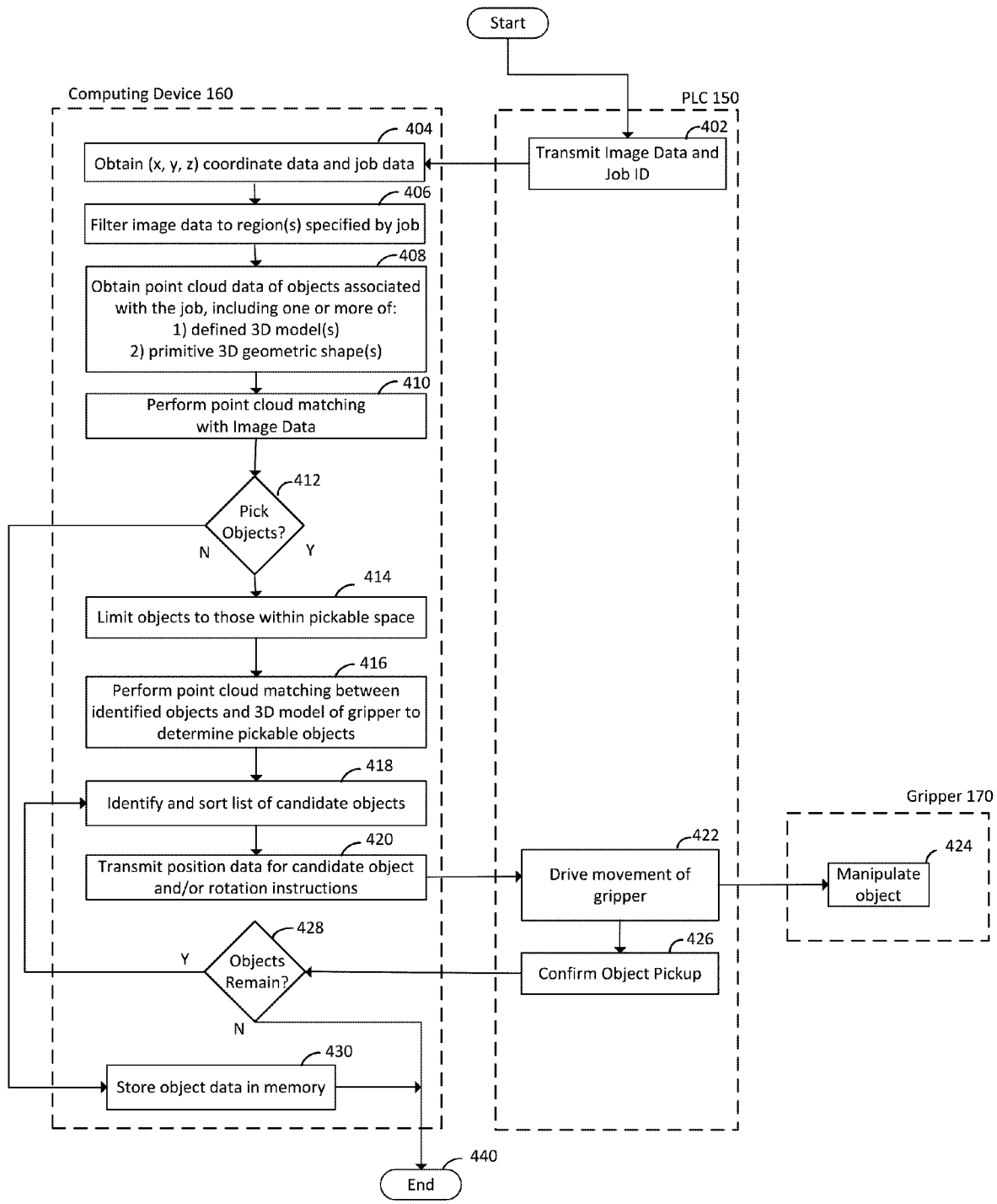
FIG. 4 is a flowchart of an object identification and picking process in accordance with some embodiments of the present disclosure.

The functionalities of identification logic 320 and instruction logic 340 are described with reference to FIG. 4. FIG. 4 depicts a flow chart with exemplary image processing and object picking functions performed by computing device 160, PLC 150, and gripper 170. The process begins in step 402, where PLC 150 transmits image data (obtained from LIDAR/camera 130) in the manner described above with reference to FIGS. 1A-C. In step 404, computing device 160 receives this data, and stores the data in image data 356 as a set of (x, y, z) coordinates or datapoints. In one embodiment, image data 356 is a table, and each line scanned by a LIDAR 130 may be stored as a separate entry in the table, though other configurations may be used in other embodiments. The imaged (x, y, z) coordinates may be used to generate a point cloud, representing keypoints sensed within the image data.

While FIG. 4 illustrates an exemplary process in which the entirety of the area image data is collected before the functions are identification logic 320 and instruction logic 340 are implemented, embodiments may exist where the data is received at the computing device 160 as the PLC 150 receives it real time, and the processing by the computing device 160 begins on the available subset of data even if the scan by the image sensor 130 has not been completed over the entire area desired to be imaged.

Figure 5:
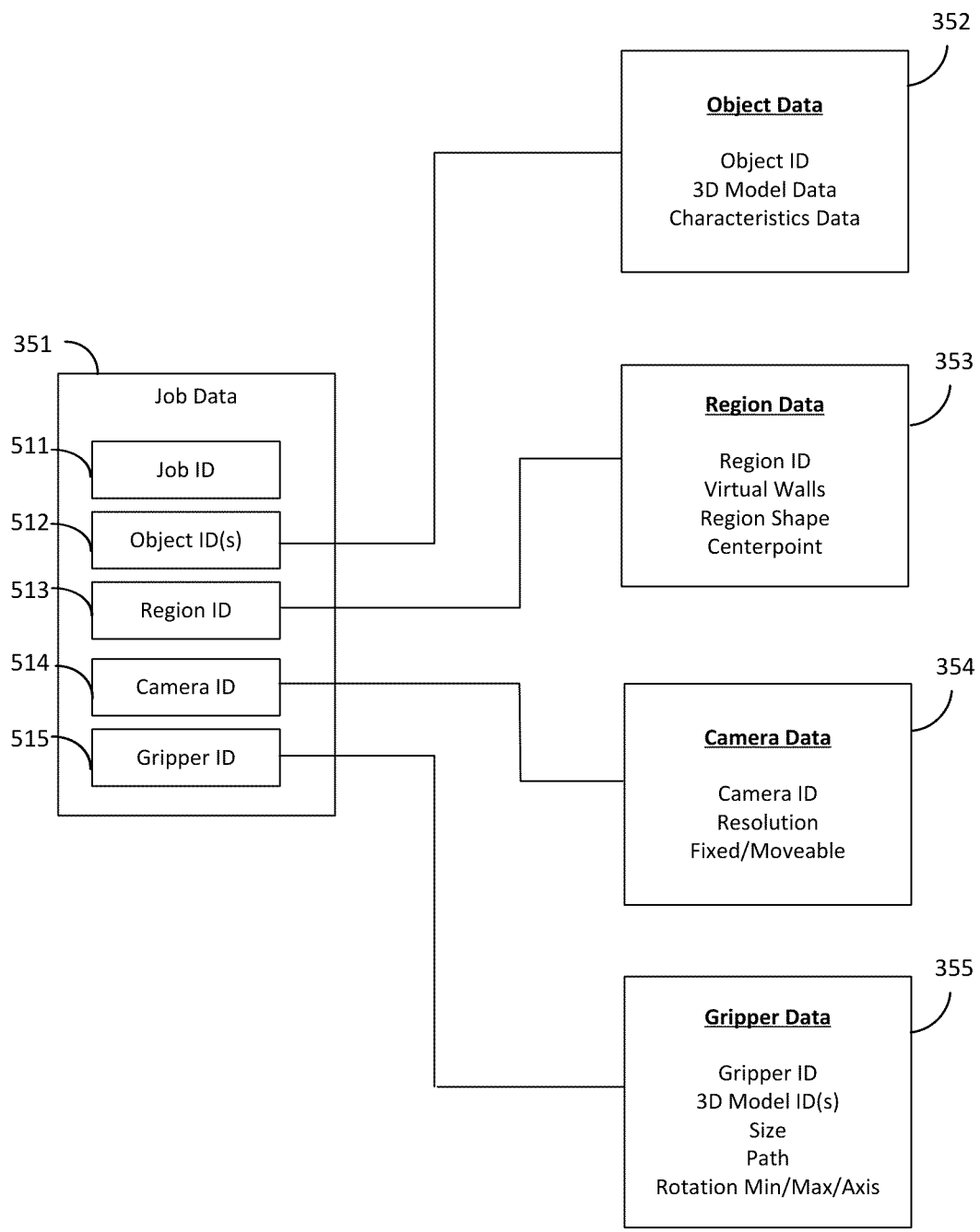
FIG. 5 depicts an exemplary data storage structure for data relating to an object identification job in accordance with some embodiments of the present disclosure.
Figure 6:
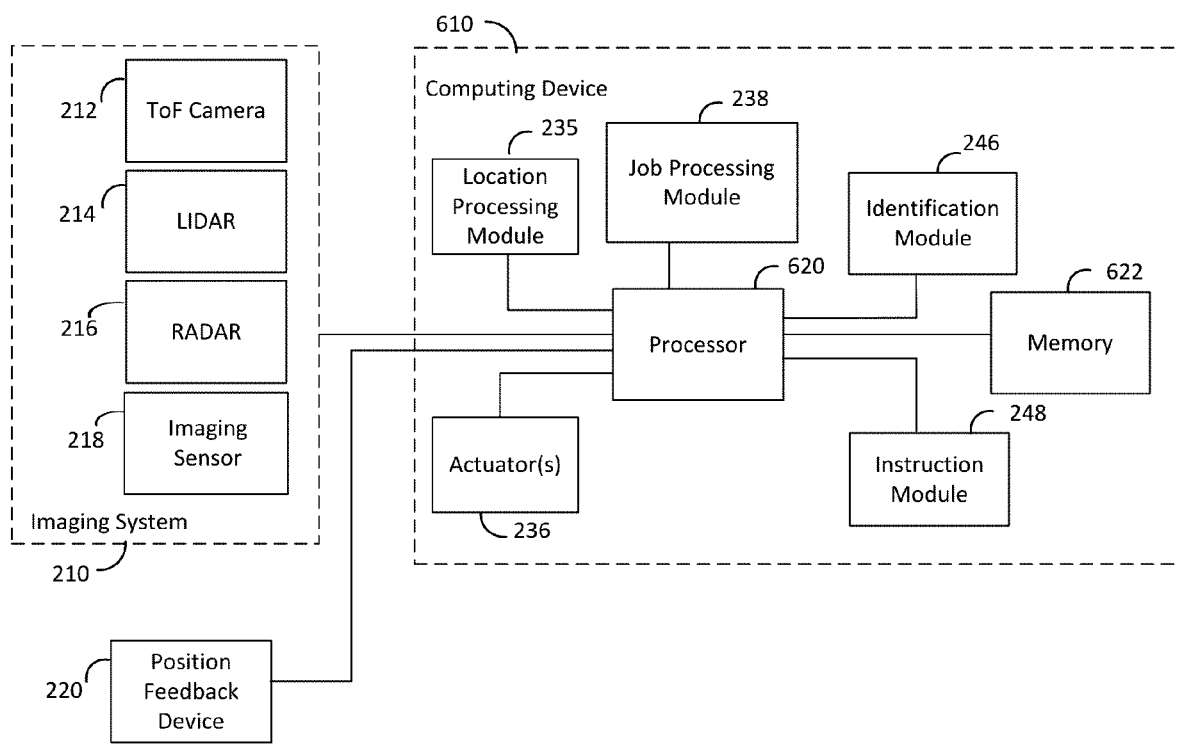
FIG. 6 depicts a block diagram of selected component parts of an object identification and picking system in accordance with some embodiments of the present disclosure.

Step 402 may also involve the receipt of job data from PLC 150. This job data may be used to define which of a plurality of stored algorithms maybe applied to filter the image data, as well as which of a plurality of possible target objects should be searched for within the image data. In one exemplary embodiment, the job data transmitted by PLC 150 to computing device 160 includes a job identifier (job ID) that computing device 160 can use to look up associated job parameters stored in memory. In another embodiment, the job data is already known or preset on computing device 160, and no job data need be sent between PLC 150 and computing device 160. In still another embodiment, all relevant job data, not limited to a job ID, is sent by PLC 150 to computing device 160, and is stored as job data 351. A job may be understood as a logical construct or data structure defining the particular goals of the imaging process. With reference to FIG. 5, a job ID 511 may uniquely identify a stored job, and more particularly, the associated job parameters, of the jobs stored in job data 351.

Filtering logic 322 may apply one or more algorithms to reduce the amount of image data that must be considered for purposes of object identification. The parameters by which the filtering logic 322 may limit image data consideration, if any, are defined by the specified job parameters. For instance, job data 351 may include among its associated parameters one or more region IDs 513 (FIG. 5), each region ID reflecting a unique set of region data 353 representing a physical area within the entire imaged area bounded by virtual walls. In one embodiment, the region data 353 may define characteristics of the region such as the position(s) of the virtual walls, a shape of the region, a centerpoint of the region, a width/length, or radius of the region, or any other data relevant to defining which portions of the image data can be effectively ignored or discarded by the filtering logic 322. More particularly, based on the parameters set out in the region data 353 identified by region ID 513, filtering logic 322 may, in step 406 of FIG. 4, filter out, ignore, discard, or otherwise de-prioritize certain portions of the image data, to limit the (x, y, z) coordinate data to only the physical region(s) that need to be searched. The shape and size of the region to be searched is dependent on the particular needs of the environment. As one example, objects to be manipulated may be located solely within a limited picking area, such as a conveyer belt, but a larger area may need to be imaged based on the resolution of the image sensor 130 and/or the dimensions of the crane components supporting the sensor 130. In such a scenario, any image data corresponding to an area not on the conveyer belt can be ignored noise. Of course, the region to be considered is not limited to any particular size or shape, such as a rectangle or circle, but can take any configuration of space within the area that was imaged, whether contiguous or noncontiguous.

The job data 351 may also be used to identify one or more objects, that is, target objects, which should be identified from among the image data imaged by the LIDAR 130 (or other 3D camera technology). A target object may be, for example, a coil, a box, a physical part or component, or any appropriate item. A job may identify one or more object IDs 512, each object ID reflecting a unique set of object data 352. Such data may include e.g., 3D model data for the object and or a set of characteristics associated with or otherwise describing the object. For example, the object data 352 may define characteristics of the object such as any of material, dimensions, weight, pressure sensitivity and/or deformability, or any other characteristics relevant to the picking and/or manipulating of an object.

This object data 352 may be used by pattern matching logic 324 in the performance of steps 408 and 410 (FIG. 4). In step 408, pattern matching logic 324 obtains (or generates from the 3D models for the target object) point cloud data of the objects associated with the specified job. Specific features of a 3D model (or in some embodiments the entirety thereof) may be extracted for conversion to a point cloud. In some embodiments, this may include data of one or more of defined 3D model(s). In some embodiments, for each object, two or more 3D models are trained, each corresponding to a respective position at which the object may rest, e.g., upright, upside down, angled/rotated, etc. In some embodiments, in addition to a full surface model, one or more partial 3D models may be stored for the target object, such as thin part models cross-sections, models of uniquely-identifiable component parts or surfaces, and the like. In other embodiments, data of one or more primitive 3D geometric shapes may be used in place of a predefined 3D model. In still other embodiments, a combination of pre-defined 3D models and primitive shapes may be used for pattern matching. In other embodiments, raster data or other formats of image data may be obtained in place of the 3D models, and may be converted to point cloud data by any known method.

Pattern matching logic 324 may include one or more algorithms to perform any known method of pattern matching. In an exemplary embodiment, the pattern matching logic 324 performs point cloud matching between the obtained (viz., predefined or determinate) 3D model(s) and a position or set of positions in the filtered image data (or unfiltered image data, if no filters were applied). That is, the image data is stored as a set of points in a table or other data structure in image data 356. A table of keypoint data may be generated and stored for each known 3D model, and the two sets of stored point data are compared to determine their similarity. In some embodiments, the 3D model is a full surface model that can be rotated to position the object at any angle prior to generation of the point cloud, so as to allow ease of comparison.

In some embodiments, the pattern matching logic 324 may consider only a subset of the data points available for a 3D model, corresponding to certain important points or keypoints such as the edges of an object. For instance, the pattern matching logic 324 may limit the number of points of the model to a certain cap (e.g., 10 or 10,000 points or any appropriate value) so as to be relatively in conformance with the number of data points available in the image data. In some embodiments, the number of keypoints in the 3D model may be determined based on the number of points of the received image data itself, and in other embodiments, pattern matching logic 324 may select a number of keypoints for the 3D model based on inferences drawn from the job data. For instance, job data 351 may define a camera ID 514, each ID reflecting a unique set of camera data 354 corresponding to one or more image sensors 130 used to capture 3D image data. In one embodiment, the camera data 354 may include data on the camera's image resolution, whether the camera/sensor is fixed or moveable (e.g., individually moveable through one or more actuators or moveable along track as in FIGS. 1A-1B) or zoomed, or any other relevant information. Such data may be used in some embodiments to define the complexity of the point cloud generated on the 3D models, to keep such point clouds in a condition that can be compared to the generated image data.

After obtaining the 3D model, the pattern matching logic 324, at step 410, executes one or more algorithms that overlays the coordinates obtained from the image search onto the 3D model, and then compares the points of the 3D model to the points of the point cloud. In some embodiments, this comparison process may include scaling one of the two sets of points (e.g., a first entity) to the relative scale of the second set of points (e.g., the second entity), which may be performed by finding a set of common vertices/points, measuring the distance between those common points, and computing and applying a scale multiplier. The comparison process also includes performing a rough comparison and/or fine comparison between the sets of points for the two entities (which may include rotating/translating either of the point clouds), and computing the distances between the points of the two entities. The distances between the points may be used to determine a matching score reflecting a level of confidence that the point clouds reflect the same shape. In other words, the process defines a measurement of similarity between important points (keypoints) of the two point clouds. In some embodiments, the matching score may be a percentage value, a value between 0 and 1 or 0 to 100, a binary value, or any other appropriate measurement. The above is simply an exemplary process and in other embodiments, any known method of pattern matching may be used at step 410.

In the case a predefined 3D model is used, the pattern matching process may return a position (e.g., an (x, y, z) coordinate) in the image data to represent a centerpoint of an object determined to be similar to that defined in the 3D model. In some embodiments, the object may be symmetrical, however, for oddly shaped or irregular objects, where diameter, length, width may not be consistent, one or more sets of coordinates indicating representative points may be returned.

In another embodiment, rather than a known 3D model, the stored points of the image data is matched against one or more geometric primitives, e.g., 3D primitive shapes, such as a cylinder or a sphere. Use of geometric primitives rather than a full 3D model may be useful in cases where the dimensions or size of the objects to be identified may vary, such that the objects reflect a general shape, but do not identically match each other. In the case a primitive shape is used, the pattern matching process may use, rather than a set of points, a set of dimensions and a general shape. For instance, in an embodiment where the primitive shape is a cylinder, the parameters against which the pattern matching logic 324 searches may include, e.g., a minimum/maximum radius, minimum/maximum length on a plane, and/or minimum/maximum width. In other embodiments, such parameters may also include a thickness value.

The pattern matching process against the primitive value may return a position (e.g., an (x, y, z) coordinate) in the image data of a centerpoint of an object matching the primitive, such as the object's geometric center (e.g., center of plane or cylinder), or if an irregular or asymmetric shape, like a cone, the center of gravity. In some embodiments, in addition to the centerpoint coordinate, pattern matching logic 324 may return an angle from the centerpoint to the endpoints of the object within each of (or a subset of) the six degrees of freedom. In some embodiments, in addition to the centerpoint of the object, the pattern matching logic 324 may also obtain distance values, such as diameter, length, and/or width values, to the endpoints or relevant points on the object.

After the implementation of pattern matching logic 324, a set of one or more positions has been generated, each position corresponding to a point at which the logic determined that a target object matching an intended model or shape (e.g., a coil, a barrel, or the like) may be positioned. In some embodiments, the list may be filtered or culled based on any of a variety of parameters. One such parameter is the degree of confidence in the match, determined based on whether the matching score for the identified position exceeds a certain threshold value. In some instances, a threshold value for the matching score may be predefined (e.g., 50% or 0.5, 80% or 0.8, or the like) and stored, e.g., in connection with the particular relevant job (e.g., in object data 352). The threshold matching value may be set relatively high to minimize the recognition of "ghost" or erroneous parts (false positives), or may be set relatively low to ensure that each possible instance of the target object is recognized, regardless of the occurrence of false positives. In an exemplary embodiment, the threshold matching value may be set to 0.6, however any appropriate value may be used in different embodiments.

In some embodiments, the threshold value for the matching score may be determined by the pattern matching logic 324 at the time of comparison based on comparison results, the job conditions, and/or other factors such as image quality or resolution, object type, an expected or known number of objects, priority of the job (e.g., a criticality of misidentification or missed identification) or the like. For instance, an implementation may exist where most of the positions are matched with an extremely high matching score (e.g., 99%) but one or more positions are matched with a matching score that is, comparatively, an outlier value (e.g., 80%). In some embodiments, pattern matching logic 324 may automatically set a threshold value to remove outliers or unexpected results, even if otherwise having a relatively good matching score. Other embodiments may use any appropriate determination for how to cull or filter the identified objects. Once culled, the remaining list may be considered a list of candidate objects, that is, objects that match the intended target models or shapes, and which may be targets or candidates for pickup by a gripping component of a crane or another component capable of manipulating the object.

At step 412 of FIG. 4, the computing device 160 determines whether the objects are intended to be picked, moved, or otherwise manipulated. If not (N in step 412), for instance if the goal of the job was simply to identify or count a number of recognized objects, the process may continue to step 430, in which the candidate results are stored in memory, and the process thereafter ends. If the objects are intended to be picked up or manipulated (Y in step 412) by the crane, the process continues to step 414, in which wall check logic 326 determines whether the candidate objects are "pickable", that is, whether they are reachable by a picking/grabbing component such as gripper 170.

Wall check logic 326 begins by performing, for each candidate object, a wall check (alternatively referred to as a sweep check) in which the wall check logic 326 determines whether the gripper 170 of the crane (or other automated or robotic component, e.g., a robotic arm) can reach the object. To do this, the wall check logic 326 may rely on one or more virtual walls defined and stored in region data 353. In some embodiments, the virtual wall may correspond to a physical impediment such as a physical wall, a floor, a ceiling, a column, a bin, a building, a barrier, a stationary object, or the like, and in other embodiments, the virtual wall may signal an intended or arbitrary boundary of space around the picking area. In particular, the wall check logic 326 functions to compare the gripper 170 (or a 3D model thereof) to the position of the virtual walls. As a result of performing this function, the wall check logic 326 may ensure a buffer of space around the gripper 170, mitigating danger to objects and/or people in the area outside of the intended pickup area. Further, the wall check logic 326 acts to prevent damage to the crane or the gripper 170 by preventing the gripper 170 from colliding with physical walls or objects on the other side of a virtual wall in an attempt to grasp objects it cannot reach.

In some embodiments (not specifically shown), wall check logic 326 may also perform, for each candidate object, a check within the monitored space, in which the wall check logic 326 determines whether the gripper 170 of the crane (or other automated or robotic component, e.g., a robotic arm) can reach the object without colliding with any items in the monitored space. In particular, the wall check logic 326 functions to compare the gripper 170 (or a 3D model thereof) to the point cloud data collected from the image data. As a result of performing this function, the wall check logic 326 may ensure a buffer of space around the gripper 170 as it travels through the monitored area to the pickable object, mitigating danger to objects within the intended pickup area.

In step 416, computing device 160 determines whether the gripper 170 can access the candidate objects. Job data 351 may identify a gripper ID 515, which uniquely identifies gripper data 355 for the gripper that would be used to pick up the object. Gripper data 355 may include, for example, a 3D model ID for the gripper, allowing the wall check logic 326 to obtain a full 3D surface model for the gripper. In addition, gripper data 355 may include data about the griper, such as the size (e.g., dimensions in a length/width/height direction, the expected path of the gripper if scheduled, fixed, or otherwise predictable, and information about the rotation capabilities of the gripper, such as min/max degrees of rotation, an axis of rotation, and the like. The 3D and other relevant data is used to generate a point cloud of the keypoints of the gripper 170, which is superimposed on the candidate object(s) data in a manner where the gripper 170 is positioned so as to pick up the object. If the gripper 170 is determined to overlap, intersect, or otherwise touch the virtual walls from that position, or when approaching that position, the candidate object is determined to be not pickable. In some embodiments, the wall check logic 326 may store, in memory 350, the position of the gripper 170 that it used to determine whether the object was pickable, so that such data may later be used (by gripper check logic 344) to determine if any gripper rotation is necessary to reach any particular candidate object.

Through application of the filtering logic 322, pattern matching logic 324, and wall check logic 326 performed in steps 404-416, identification logic 320 obtains a set or list of candidate objects known to be pickable. Instruction logic may then sort this list (step 418) and transmit it (step 420) to the PLC 150, which in turn drives movement of the gripper 170 (step 422) to manipulate a candidate object from the list (step 424).

In step 418, sorting logic 342 acts to sort the candidate objects for transmission to the PLC 150. As the PLC 150 can only drive the gripper 170 to one position at a time, in an exemplary embodiment, the candidate object position data is sent to the PLC 150 serially, based on an order of priority assigned to each of the candidate object positions. In one embodiment, the candidate object positions may be sorted in reducing order of their z-axis position, a solution particularly useful in embodiments where objects to be picked are likely to be stacked, and therefore, the topmost objects should be removed first. In another embodiment, the order of priority (the sorting order) is determined based on the distance between the (x, y, z) coordinate position of the centerpoint of a candidate object, and some origin position of the gripper 170. This distance may be calculated by the sorting logic 342 through a triangulation calculation or any other distance-determining algorithm, such as trilateration, sensor-specific mechanisms such as a received signal strength indicator (RSSI), or the like. In various embodiments, this origin position may be a resting position of the crane, the current position of the crane at the time the candidate position is intended to be sent, a position at which the previously manipulated candidate objects will be released by the gripper, a central position of the imaged area or the filtered image data, or any other appropriate position. For instance, one embodiment may exist where the gripper returns to the center of the room (or the imaged area) after each object is picked up, which case the sorting logic 342 may sort the candidates from that central position. In still another embodiment, sorting logic 342 may prioritize the candidate objects by their matching scores, i.e., to first pick the objects that the computing device 160 is most confident meets the parameters of the identified job.

Gripper check logic 344 may determine, for each of the sorted candidate object data, whether any rotation of gripper 170 is necessary to reach the particular candidate object. For instance, in a case that the gripper 170 would, in a nominal position, interfere with a virtual wall or another object, the gripper check logic 344 may determine that the gripper can be rotated (or in some embodiments shifted) away from the nominal position to reach the object without interference. This determination may result, in some embodiments, in the generation of a new pick point to be substituted for the candidate object position sent to the PLC 150, the new pick point being a new position to which the gripper should be moved, and/or an axis of rotation and degree of rotation to which the gripper should be controlled. In one embodiment, gripper check logic 344 may obtain this pick point position from data stored in memory 244 by wall check logic 326. In other embodiments, gripper check logic 344 may itself determine a pick point and rotation angle by executing one or more algorithms to obtain a 3D model of the gripper 170 (taken from gripper data 355), superimpose the obtained model on the candidate object(s) data, and check for any collision or interference between the gripper and one or more virtual walls (from region data 353) or other objects. In an exemplary embodiment, this process may involve one or more iterations of rotations of the 3D model of the gripper, by any determined incremental degree of rotation, after which a recheck for collision is performed. When the check or recheck indicates that the gripper 170 will not collide with any interfering object, then the gripper check logic 344 may determine the degree and/or axis of rotation, and may associate that information with the candidate position data. In some embodiments, the determined incremental degree of rotation may begin with large amounts of rotation (e.g., 90 degrees) and may subsequently rotate (in some cases in alternating or varying directions) at smaller increments until the correct degree of rotation is found. In other embodiments, e.g., where the job data 351 or object data 352 indicates that the object is only capable of resting in a limited number of positions, a predetermined position and/or degree of rotation may be first tried and checked.

Instruction logic 340 sends, in step 420, a set of data to PLC 150. In one embodiment, the data includes, for one candidate position, e.g., the position with the highest priority, a set of coordinates and/or angles to which the gripper should be controlled to move. In one embodiment, such data may take the form of an (x, y, z) coordinate, and a set of R(x), R(y), and R(z) values, indicating necessary rotation around each of the x, y, and z axes. In the exemplary embodiment, this set of information is sent separately for each candidate, in a serial manner, however, other embodiments may exist where the information is sent in a bulk transmission, and then sorted or prioritized by one or more logics executed by PLC 150. In some embodiments, rather than PLC 150, the coordinate and/or rotation information may be transmitted to another processing system.

In step 422, PLC 150 receives the information from computing device 160 and drives movement of the gripper 170, which in turn picks up and/or manipulates the instructed candidate object (step 424). The PLC 150 may then send a confirmation of successful pickup (step 426) (or other successful manipulation) to the computing device 160. In the exemplary embodiment, the confirmation may contain a request for another object to be picked up, and the computing device 160, receiving this confirmation, determines in step 428 whether any other pickable candidate objects remain. In another embodiment, the computing device 160 may make this determination for additional objects after a set amount of time (e.g., in seconds or milliseconds), even if no response is received from the PLC 150. If no pickable candidate objects remain (N in step 428), the process ends at step 440. If pickable candidate objects do remain (Y in step 428), the process cycles back to step 418, in which the sorting logic 342 may resort the objects, if appropriate. If no resorting is necessary, the next candidate object on the list is sent to the PLC 150 based on its associated priority. In some embodiments, the movement of the gripper 170 to the location of the first, picked candidate object may present an opportunity to the resort the candidate objects by their distance from the new position of the gripper 170. That is, although additional computing is performed, wasteful movement of the gripper 170 may be mitigated and overall efficiency of pickup improved by recalculating distance-based priority of pickup.

In the illustrated embodiment of FIG. 4, the PLC 150 does not report a case where the gripper 170 does not successfully pick up the object, such that the process merely moves on the next candidate object, regardless of success or failure. However, in an alternate embodiment (not shown), the PLC 150 may report the failure to the computing device 160. In a case where the candidate object has not changed position due to the gripper 170's attempt to pick it up, the computing device may, in response, recalculate position and/or rotation instructions for that same candidate object, and retransmit that data to the PLC 150. In a case where the candidate object has changed position, the process may end unsuccessfully (step 440), or may begin again with the collection of new image data by the image sensor 130.

In the embodiment of FIG. 4 described above, a single image sensor scan is performed to obtain a single set of image data. Such an embodiment may optimize the process to minimize cycle time. However, in another embodiment may exist where two scans of the area below the sensor 130: both a rough scan by the image sensor 130 positioned on the crane and a fine (viz., high resolution) scan by another image sensor on the gripper 170. In this alternate embodiment, the steps 402-418 may proceed similarly (in some embodiments without the filtering of step 406), however, the computing device 160 may provide only a set of coordinates for the candidate objects to the PLC 150. The PLC 150 may then drive the gripper 170 to the location of a candidate object, or an approximate or expected location of the object, if the resolution of the image data does not permit a high confidence identification of an object. An image sensor on the gripper 170 may then take a second image of the object(s) from the new position, positioned at a closer distance. This closer image data may be sent to one or more of PLC 150 or computing device 160, and may be used to determine an offset and/or rotation degree and axes that the gripper should be moved upon to pick up the object.

In yet another embodiment, the image sensor 130 positioned on the crane may take a rough image of the larger area, and, rather than performing a point cloud comparison, computing device 160 may merely identify an area of interest, and may provide to PLC 150 a centerpoint (or other point) within that area. The area of interest may be a region where one or more objects are likely to be, even if the actual type or number of objects has not been identified with confidence. The gripper 170, once relocated to that position, may then take a second image of the object(s) from the new position using an image sensor located on the gripper itself. The image taken from the gripper contains less data for the computing device 160 to process as it covers less spatial area. In this embodiment, this second set of image data may be sent back to the computing device 160 to be processed by exemplary steps 404-440. This embodiment may be beneficially implemented where the image sensor 130 does not provide a high enough resolution for accurate identification of images when covering a relatively large spatial area.

In some embodiments, where a list of recognized candidate objects is stored in a memory of the computing device 160 (step 430 of FIG. 4), the stored object data may be used by computing device 160, or another networked device, to generate or derive metrics reflecting information about the recognized objects. In some embodiments, the computing device 160 may provide an object count, or may associate objects with data regarding, e.g., position/placement, errors in picking the objects, image sensing timing, or other relevant data. In some embodiments, image data collected from several differently positioned image sensors 130, or individual systems each comprising a 3D camera and a crane and/or grabber positioned at different locations or having different types, may be processed by computing device(s) 160 as described in FIGS. 1-6. The candidate object data collected from that various image data may be collected and aggregated or compiled together, such that metrics on different imaging systems can be generated and evaluated.

By means of the methods and systems described above, in which 3D image sensors (such as LIDAR) are positioned on a crane or other high-positioned location, effective picking solutions can be implemented for large area applications. Because of the large spatial range of the 3D image data collected, a greater volume of image data and the generation of larger data point clouds than conventional applications allow. The 3D imaging solution described herein, whether LIDAR, 3D cameras, RADAR, or the like, is employed on a crane designed to move on a fixed path, to identify determinate objects. These objects may be defined with particularity for a required job, and therefore may be highly customizable by object type or dimensions, using defined 3D surface models, or in some embodiments, primitive geometric shapes that allow for flexibility of object recognition. By these means, data from a large spatial area can be more accurately and effectively analyzed. In addition, reliable, accurate positioning results can be provided to drive the gripping components of a crane, to minimize identification and pickup errors or inefficiencies, even when a large physical area has been imaged.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

What is claimed is:

1. An object picking system comprising:
a crane comprising a gripper capable of picking up an object;
a control module having an actuator configured to control movement of the gripper;
an image sensor mounted on the crane, wherein the image sensor is mounted on a beam that is coupled to a track and movable along the track; and
a computing system comprising at least one processor configured to:
receive a first set of 3D image data, generated by the image sensor, representing sensed data within a predetermined area;
receive position data identifying a position of the crane associated with the first set of 3D image data;
determine a target object to be identified within the first set of 3D image data;
determine a point cloud of data points representing the target object based on a 3D model for the target object or a primitive 3D geometric shape for the target object;
apply a filtering algorithm to the set of 3D image data, so as to generate a second set of 3D image data that contains less data points than the first set of 3D image data;
identify one or more object locations based on a comparison of the second set of 3D image data to the point cloud of data points representing the target object;
generate a set of position data based on the identified one or more object locations;
determine, for each position data within the generated set of position data, whether or not the position data represents the location of a pickable object; and
transmit, to the control module, position data determined to represent the location of a pickable object.

2. The object picking system of claim 1, wherein the image sensor is mounted on the crane so as to be moveable in a fixed path with a changeable position in one or more of an x, y, or z direction.

3. The object picking system of claim 1, wherein the image sensor is a LIDAR device.

4. The object picking system of claim 1, wherein the determination of the 3D model for the target object is based on the 3D model and comprises:
obtaining, from a memory, the 3D model for the target object.

5. The object picking system of claim 1, wherein the determination of the target object to be identified within the first set of 3D image data comprises:
calculating dimensions for the target object based on the primitive 3D geographic shape.

6. The object picking system of claim 1, wherein the application of the filtering algorithm to the set of 3D image data comprises:
obtaining, from a memory, a point cloud of data points representing a shape of the gripper;
comparing point cloud data for an object located at the identified one or more object locations to the point cloud representing the shape of the gripper;
determining, based on the comparison, rotation data for the gripper, wherein the rotation data represents a movement of the gripper, around an axis of rotation, necessary for the gripper to be positioned in a manner allowing pick up of the object located at the identified one or more object locations, and
transmitting, to the control module, in association with position data determined to represent the location of the object, the determined rotation data.

7. The object picking system of claim 6, wherein the rotation data comprises a rotational axis from 0 degrees.

8. The object picking system of claim 1, wherein the one or more object locations are identified based on a surface-based matching result score between the second set of 3D image data and the point cloud of data points representing the target object.

9. The object picking system of claim 1, wherein the position data based on the identified one or more object positions includes one or more of: a centerpoint of an object, an endpoint of the object, and a center axis of the object.

10. A method for automatically identifying objects from image data generated by an image sensor mounted on a crane, the method comprising:
receiving a first set of 3D image data, generated by the image sensor, representing sensed data within a predetermined area, wherein the image sensor is mounted on a beam that is coupled to a track and movable along the track;
receiving position data identifying a position of the crane associated with the first set of 3D image data;
determining a target object to be identified within the first set of 3D image data;
determining a point cloud of data points representing the target object based on a 3D model for the target object or a primitive 3D geometric shape for the target object;
applying a filtering algorithm to the set of 3D image data, so as to generate a second set of 3D image data that contains less data points than the first set of 3D image data;
identifying one or more object positions based on a comparison of the second set of 3D image data to the point cloud of data points representing the target object;
generating a set of position data based on the identified one or more object positions;
determining, for each position data within the generated set of position data, whether or not the position data represents the location of a pickable object; and
transmitting, to a device configured to control one or more components of the crane, position data determined to represent the location of a pickable object.

11. The method of claim 10, wherein the position data based on the identified one or more object positions includes one or more of: centerpoint of an object, an endpoint of the object, and a center axis of the object.

12. The method of claim 10, wherein the image sensor is mounted on the crane so as to be moveable in a fixed path with a changeable position in one or more of an x, y, or z direction.

13. The method of claim 10, wherein the image sensor is a LIDAR device.

14. The method of claim 10, wherein the determining the point cloud of data points representing the target object comprises:
obtaining, from a memory, the 3D model for the target object.

15. The method of claim 10, wherein the determining the point cloud of data points representing the target object comprises:
calculating dimensions for the target object based on the primitive 3D geographic shape.

16. The method of claim 10, wherein the application of the filtering algorithm to the set of 3D image data comprises:
obtaining, from a memory, a point cloud of data points representing a shape of the gripper;
comparing point cloud data for an object located at the identified one or more object locations to the point cloud representing the shape of the gripper;
determining, based on the comparison, rotation data for the gripper, wherein the rotation data represents a movement of the gripper, around an axis of rotation, necessary for the gripper to be positioned in a manner allowing pick up of the object located at the identified one or more object locations, and
transmitting, to the device configured to control movement of the gripper, in association with position data determined to represent the location of the object, the determined rotation data.

17. The method of claim 10, wherein the rotation data comprises a rotational axis from 0 degrees.

18. The method of claim 10, wherein the one or more object locations are identified based on a surface-based matching result score between the second set of 3D image data and the point cloud of data points representing the target object.

19. A non-transitory computer-readable storage medium comprising instructions stored therein, which when executed by one or more processors, cause the one or more processors to perform operations comprising:
receiving a first set of 3D image data representing sensed data within a predetermined area, the first set of 3D image being generated by an image sensor mounted on a crane, wherein the image sensor is mounted on a beam that is coupled to a track and movable along the track;
receiving position data identifying a position of the crane associated with the first set of 3D image data;
identifying a target object to be identified within the first set of 3D image data;
determining a point cloud of data points representing the target object based on a 3D model for the target object or a primitive 3D geometric shape for the target object;
applying a filtering algorithm to the set of 3D image data, so as to generate a second set of 3D image data;
identifying one or more object positions based on a comparison of the second set of 3D image data to the point cloud of data points representing the target object;
generating a set of position data based on the identified one or more object positions; and
transmitting, to a device configured to control one or more components of the crane, position data, of the set of position data, representing an identified object position.

20. The object picking system of claim 19, further comprising a sensor configured to detect a location of the image sensor.

21. The object picking system of claim 1, wherein the at least one processor is further configured to receive a job identifier and to select the 3D model for the comparison based on the job identifier.

22. An object picking system comprising:

a crane comprising a gripper capable of picking up an object;
a control module having an actuator configured to control movement of the gripper;
an image sensor mounted on the crane; and
a computing system comprising at least one processor configured to:
 receive a first set of 3D image data, generated by the image sensor, representing sensed data within a predetermined area;
 receive position data identifying a position of the crane associated with the first set of 3D image data;
 determine a target object to be identified within the first set of 3D image data;
 determine a point cloud of data points representing the target object based on a 3D model for the target object or a primitive 3D geometric shape for the target object;
 apply a filtering algorithm to the set of 3D image data, so as to generate a second set of 3D image data that contains less data points than the first set of 3D image data;
 identify one or more object locations based on a comparison of the second set of 3D image data to the point cloud of data points representing the target object;
 generate a set of position data based on the identified one or more object locations;
 determine, for each position data within the generated set of position data, whether or not the position data represents the location of a pickable object; and
 transmit, to the control module, position data determined to represent the location of a pickable object,
wherein the at least one processor in applying the filtering algorithm is configured to:
 identify a portion of the first set of 3D image data representing an object at a location that is inaccessible to the gripper; and
 filter out the portion of the first set of 3D image data in response to a determination that the portion represents the object that is inaccessible to the gripper.

23. The object picking system of claim 22, wherein the at least one processor in applying the filtering algorithm is configured to identify the portion based on a location of a virtual object within the first set of 3D image data, the virtual object corresponding to a physical object that limits a range of movement of the gripper.

24. An object picking system comprising:
an overhead crane comprising a gripper capable of picking up objects;
a control module having an actuator configured to control movement of the gripper;
an image sensor mounted on the overhead crane; and
a computing system comprising at least one processor configured to:
 receive a first set of 3D image data, generated by the image sensor, representing sensed data within an area;
 receive position data identifying a position of the crane associated with the first set of 3D image data;
 receive a job identifier identifying a job associated with moving at least one target object within the area;
 based on the job identifier, select a 3D model for the at least one target object for use in performance of the job;
 retrieve from memory the selected 3D model for the at least one target object;
 determine a point cloud of data points representing the at least one target object based on the 3D model;
 identify a portion of the 3D image data associated with an area that is inaccessible to the gripper;
 filter the first set of 3D image data to remove the identified portion, so as to generate a second set of 3D image data that contains less data points than the first set of 3D image data;
 compare the point cloud of data points representing the at least one target object to data points of the second set of 3D image data to identify the at least one target object in the second set of 3D image data;
 based on the position data and identification of the at least one target object in the second set of 3D image data, determine at least one object location for the at least one target object; and
 transmit, to the control module, position data indicating the at least one object location for the at least one target object,
wherein the control module is configured to control the gripper with the actuator to cause the gripper to pick up and move the at least one target object based on the position data indicating the object location for the at least one target object.

25. The object picking system of claim 24, wherein the at least one processor is configured to identify the portion based on a location of a virtual object within the first set of 3D image data, the virtual object corresponding to a physical object that limits a range of movement of the gripper.

26. An object picking method comprising:
controlling movement of a gripper of a crane with an actuator, the gripper capable of picking up an object;
receiving, with at least one processor, a first set of 3D image data generated by an image sensor mounted on the crane, the first set of 3D image data representing sensed data within a predetermined area;
receiving, with the at least one processor, position data identifying a position of the crane associated with the first set of 3D image data;
determining, with the at least one processor, a target object to be identified within the first set of 3D image data;
determining, with the at least one processor, a point cloud of data points representing the target object based on a 3D model for the target object or a primitive 3D geometric shape for the target object;
applying, with the at least one processor, a filtering algorithm to the set of 3D image data, so as to generate a second set of 3D image data that contains less data points than the first set of 3D image data;
identifying, with the at least one processor, one or more object locations based on a comparison of the second set of 3D image data to the point cloud of data points representing the target object;
generating, with the at least one processor, a set of position data based on the identified one or more object locations;
determining, with the at least one processor for each position data within the generated set of position data, whether or not the position data represents the location of a pickable object; and
transmitting, with the at least one processor to the control module, position data determined to represent the location of a pickable object,
wherein the applying comprises:
 identifying a portion of the first set of 3D image data representing an object at a location that is inaccessible to the gripper; and
 filtering out the portion of the first set of 3D image data in response to a determination that the portion represents the object that is inaccessible to the gripper.

27. The method of claim 26, wherein the applying further comprises identifying the portion based on a location of a virtual object within the first set of 3D image data, the virtual object corresponding to a physical object that limits a range of movement of the gripper.

28. An object picking method comprising:
- controlling movement of a gripper of an overhead crane with an actuator, the gripper capable of picking up objects;
- receiving, with at least one processor, a first set of 3D image data generated by an image sensor mounted on the overhead crane, the first set of 3D image data representing sensed data within an area;
- receiving, with the at least one processor, position data identifying a position of the crane associated with the first set of 3D image data;
- receiving, with the at least one processor, a job identifier identifying a job associated with moving at least one target object within the area;
- based on the job identifier, selecting with the at least one processor a 3D model for the at least one target object for use in performance of the job;
- retrieving, with the at least one processor from memory, the selected 3D model for the at least one target object;
- determining, with the at least one processor, a point cloud of data points representing the at least one target object based on the 3D model;
- identifying, with the at least one processor, a portion of the 3D image data associated with an area that is inaccessible to the gripper;
- filtering, with the at least one processor, the first set of 3D image data to remove the identified portion, so as to generate a second set of 3D image data that contains less data points than the first set of 3D image data;
- comparing, with the at least one processor, the point cloud of data points representing the at least one target object to data points of the second set of 3D image data to identify the at least one target object in the second set of 3D image data;
- based on the position data and identification of the at least one target object in the second set of 3D image data, determining with the at least one processor at least one object location for the at least one target object;
- transmitting, with the at least one processor to the control module, position data indicating the at least one object location for the at least one target object; and
- controlling the gripper with the actuator to cause the gripper to pick up and move the at least one target object based on the position data indicating the object location for the at least one target object.

29. The method of claim 28, further comprising identifying, with the at least one processor, the portion based on a location of a virtual object within the first set of 3D image data, the virtual object corresponding to a physical object that limits a range of movement of the gripper.

* * * * *